United States Patent Office 3,520,808
Patented July 21, 1970

3,520,808
LUBRICATING COMPOSITIONS CONTAINING NOVEL PHOSPHINIC REACTION PRODUCTS
Kenneth K. Light, Freehold, N.J., assignor to Mobil Oil Corporation, a corporation of New York
No Drawing. Filed June 4, 1968, Ser. No. 734,220
Int. Cl. C10m 1/48, 3/42; C10l 1/24
U.S. Cl. 252—46.6                    18 Claims

ABSTRACT OF THE DISCLOSURE

Reaction products are produced by the reaction between thionophosphinesulfide dimers and phosphorus nucleophiles. These products are useful additives for industrial organic base media.

BACKGROUND OF THE INVENTION

Field of the invention

This invention relates to reaction product of phosphorus- and sulfur-containing organic reactants. More specifically, this invention relates to thionophosphinesulfide derivatives and their use as additives in industrial organic fluids.

Description of the prior art

The preparation of phosphosulfurized hydrocarbons is well known in the art. As described in U.S. 3,235,497, and U.S. 3,213,019, an olefin is reacted with a phosphorus sulfide, such as $P_2S_5$. The resulting product, while useful as an additive for industrial fluids itself, is acidic. Normally, it is neutralized by subjecting it to further reaction with metal bases or alcohols in accordance with the teaching of the aforenoted patents. The precursor and its derivatives are said to have detergent and antioxidant properties in lubrication applications. In U.S. 3,291,734, the product is reacted with a glycol and then with a glycol borate.

SUMMARY OF THE INVENTION

It has now been discovered that certain novel and useful phosphorus-sulfur containing compounds, having improved oxidation inhibition properties, are obtained by reacting together a phosphosulfurized hydrocarbon or thionophosphine sulfide and a phosphorus nucleophile, such as a phosphine or phosphite, thiophosphite or aminophosphite.

DESCRIPTION OF SPECIFIC EMBODIMENTS

The phosphosulfurized hydrocarbon can be produced by the conventional manner. An olefinic hydrocarbon or an aromatic hydrocarbon is reacted with a phosphorus sulfide, preferably $P_2S_5$, but also $P_4S_5$ or $P_4S_7$. The hydrocarbon may be an olefin, including cyclic olefins, aryl-substituted olefins, and polymers thereof, having one or more unsaturated bonds, or an aromatic, or an alkylated aromatic. The monomeric olefin or aromatic hydrocarbon may have from 2 to about 35 carbon atoms. Polymeric olefinic hydrocarbons, such as polypropylene and polybutylene, may have molecular weights of from about 500 to about 50,000, preferably from 500 to 1500. Most preferably, the reactant is a mono-olefin having from 6 to 18 carbon atoms.

The hydrocarbon is reacted with the phosphorus sulfide, most conveniently at temperatures ranging from about 40° to about 200° C., preferably 75° to 150° C., for a period of from 1 to 20 hours. Excess hydrocarbon can be used if desired to ensure complete reaction, although generally stoichiometric amounts may be sufficient.

Alternatively, the phosphosulfurized hydrocarbon may be prepared by reacting a hydrocarbyl dihalophosphine sulfide with hydrogen sulfide. The reaction conditions for this reaction are substantially the same as described above. The hydrocarbyl dihalophosphine sulfide precursor may be produced by reacting an olefin or aromatic hydrocarbon with a dialkyl phosphonate, in the presence of an organic peroxide, and treating that resulting product, consecutively, with a phosphorus halide, such as $PCl_5$, and a phosphorus sulfide, such as $P_2S_5$.

The product of either route is believed to have the structure

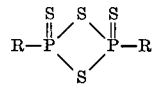

wherein R is alkyl, alkenyl or aryl; when the first route is employed, R is alkenyl or aryl. R preferably is alkenyl and contains from 6 to 18 carbon atoms.

The phosphosulfurized hydrocarbon or the hydrocarbyl thionophosphine sulfide, is reacted with a phosphorus compound of the formula $P(R')_3$, wherein $R'$ is a hydrocarbyl group or a hydrocarbyloxy group, or a hydrocarbylthio group or a hydrocarbylamino group. Thus the $R'$ groups may be alkyl, alkenyl, cycloalkyl, aralkyl, aryl, alkaryl, alkoxy, cycloalkoxy, aralkoxy, aryloxy, alkarylroxy, alkylthio, cycloalkythio, aralkylthio, arylthio, alkenylthio, alkylamino, aralkylamino, arylamino, and alkarylamino, and halogen derivatives thereof. These groups may contain from 1 to 30 carbon atoms, they may be different from each other. $R'$ is preferably alkyl having from 2 to 15 carbon atoms.

The reaction is believed to follow the sequence shown:

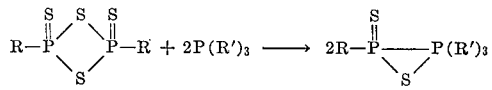

wherein R is the hydrocarbyl group of the phosphorus sulfide reaction, and $R'$ is defined previously. The final structure shown, however, is not known with certainty. Hence, the product is preferably defined according to the reaction employed in producing the product.

The reaction products of this invention find utility in many industrial organic base media to which they provide excellent antioxidant properties. Liquid media, such as hydraulic fluids, lubricants, heat exchange fluids, hydrocarbon fuels, greases, polymers and the like are benefitted by the presence of these compounds. In particular, lubricants, both mineral oils and synthetic oils, are improved. Synthetic oils include hydrocarbon oils, long chain alkanes, such as cetane, olefin polymers, such as trimers and tetramers of octene and decene, ester oils: diols, trialkyloalkanes, and pentaerythritol esters of monocarboxylic acids having 2 to 20 carbon atoms, polyglycol ethers, polyacetals, siloxane fluids, and so forth. The additives may be used in concentrations of from 0.05% to about 10% by weight, preferably 0.1% to 5%. Other additives, such as detergents, antioxidants, extreme pressure agents and the like may also be present.

Having described the invention in broad terms, the following specific examples are present to illustrate the preferred embodiments thereof.

EXAMPLE 1

A mixture of 140 g. (1.0 mole) of decene-1 and 111 g. (0.50 mole) of $P_2S_5$ were refluxed in 200 ml. xylene for three hours. The xylene solvent was removed by vacuum distillation. The product was a hazy yellow oil weighing 225 g. (96%). To 23.4 g. (0.05 mole) of the decenyl-thionophosphine sulfide thus prepared was added 20.2 g. (0.10 mole) tributylphosphine. The mixture was warmed until it became clear, and was then held at 100° C. at 20 mm. Hg for one hour to remove any volatile materials. A yield of 40.4 g. of a clear yellow oil was obtained.

*Analysis*—Calc. (percent): C, 60.5; H, 10.5; P, 14.2;

S, 14.7. Found (percent): C, 58.1; H, 10.2; P, 14.2; S, 16.8.

EXAMPLE 2

Following the procedure of Example 1, 15.0 g. of decenylthionophosphine sulfide was reacted with 22.2 g. of triethyl phosphite to yield 34.2 g. of a clear oil.

*Analysis.*—Calc. (percent): P, 15.1; S, 15.5. Found (percent): P, 15.6; S, 13.4.

EXAMPLE 3

Hexadecenylthionophosphine sulfide was prepared by the method described in Example 1. Following the procedure of Example 1, 20.2 g. of tributylphosphine and 31.8 g. of hexadecenylthionophosphine sulfide were reacted to yield 50.6 g. of a clear yellow oil.

*Analysis.*—Calc. (percent): P, 11.9; S, 12.3. Found (percent): P, 10.8; S, 13.7.

EXAMPLE 4

Phenylthionophosphine sulfide was prepared by passing $H_2S$ gas through liquid phenylthiophosphinic dichloride at 190° until no additional HCl was given off. The product was heated at 100° while the solution was purged with dry nitrogen in order to remove any volatile materials.

The phenylthionophosphine sulfide thus obtained was reacted following the procedure of Example 1, using 17.2 g. (0.05 mole), of the sulfide and 25 g. (0.10 mole) of tributyl phosphite. A yield of 41.3 g. of an orange oil was obtained.

*Analysis.*—Calc. (percent): P, 14.6; S, 15.1. Found (percent): P, 15.1; S, 15.7.

EXAMPLE 5

A mixture of 13.1 g. (0.05 mole) of triphenylphosphine and 12.7 g. of decenylthionophosphine sulfide were dissolved in benzene and refluxed for one hour. The benzene was removed on a water bath at 20 mm. pressure, yielding 25 g. of a white semisolid material.

EXAMPLE 6

A mixture of 10 g. of triphenyl phosphite (0.0322 mole) and 7.54 g. (0.0164 mole) of decenylthionophosphine sulfide was refluxed in 50 cc. of benzene for 4 hours. The benzene was removed under vacuum on a water bath to yield 16.6 g. of a colorless oil.

EXAMPLE 7

A mixture of 330 g. (3 moles) of dimethylphosphonate and 140 g. (1 mole) of decene were heated to 150° C. and 4.5 g. of di-t-butyl peroxide was added over a period of two hours. The resulting mixture was held at 150° C. for one additional hour. The excess dimethylphosphonate was removed by vacuum distillation. A yield of 250 g. (100%) of a slightly yellow oil was obtained.

After heating 200 g. of the dimethyl decylphosphonate thus obtained to 125° C., 330 g. of $PCl_5$ was added slowly. An exothermic reaction ensued, and when addition was complete, the mixture was refluxed for one-half hour, and then distilled to remove the volatile material. Vacuum distillation of the residue gave 117.5 g. of n-decylphosphonic dichloride, B.P. 120–125° C. (0.3 mm.).

To 50 g. of n-decylphosphonic dichloride was added 10 g. of $P_2S_5$ and the mixture was heated in a nitrogen atmosphere at 150° C. for four hours. The resulting dark oil was filtered and distilled under vacuum to yield 33.2 g. of n-decylthiophosphonic dichloride, B.P. 112–115° C. (0.25 mm.).

$H_2S$ was bubbled into 15.0 g. of n-decylthiophosphonic dichloride which had been heated to 175° C. until no additional HCl was given off. The liquid was then purged with dry nitrogen to remove any volatile materials. A yield of 9.7 g. of n-decylthionophosphine sulfide was obtained.

The n-decylthionophosphine sulfide obtained in the preceding series of reactions was reacted with tributylphosphine by the method of Example 1. A mixture of 2.0 g. of decylthionophosphine sulfide and 1.71 g. of tributylphosphine gave 3.7 g. of a clear oil.

*Analysis.*—Calc. (percent): P, 14.11; S, 14.61. Found (percent): P, 14.63; S, 13.8.

EXAMPLE 8

Following the procedure of Example 1, 23.4 g. (0.05 mole) of decenylthionophosphine sulfide is reacted with 24.7 g. (0.10 mole) of hexaethylphosphorous triamide to yield 47 g. of the adduct.

EXAMPLE 9

Following the procedure of Example 1, 23.4 g. (0.05 mole) of decenylthionophosphine sulfide is reacted with 29.8 (0.10 mole) of tributyl trithiophosphite to yield 52.2 g. of the adduct.

EVALUATION OF PRODUCTS

Catalytic oxidation test

The products of this invention were tested in an oil medium in an oxidation test. The test oil sample is subjected to an air stream at 5 liters per hour for 40 hours, at a temperature of 325° F. Present in the test oil were samples of iron, copper, aluminum and lead. The change in neutralization number (NN) measured by ASTM D–974 and kinematic viscosity (KV) at 210° F., and the loss in milligrams of the lead specimen were noted. The oil medium was a solvent refined mineral oil. The results are reported in the following table:

TABLE 1

| Additive | Conc., wt. percent | Net NN change | KV change, percent | Lead loss, mg. |
|---|---|---|---|---|
| None | | 17 | 230 | 39 |
| Product of Example 1 | 2 | −.50 | 9 | 4 |
| | 1 | −.50 | 7 | 3 |
| | 0.5 | 1.2 | 14 | 10 |
| Product of Example 2 | 2 | 0.14 | 10 | 6.7 |
| | 1 | −0.11 | 11 | 10.4 |
| | 0.5 | 0.90 | 9 | 17 |
| Product of Example 3 | 2 | 0.58 | 9 | 0.4 |
| | 1 | 0.36 | 9 | 0.2 |
| | 0.5 | 3.3 | 16 | 9 |
| Product of Example 4 | 2 | 0.26 | 8 | 0.4 |
| | 1 | 1.26 | 10 | 0.3 |
| | 0.5 | 1.06 | 12 | 1.0 |
| Product of Example 5 | 2 | 0.09 | 4 | 2 |
| Product of Example 6 | 2 | −0.66 | 7 | 0.1 |
| | 1 | −0.90 | 7 | 0.0 |
| | 0.5 | −0.90 | 7 | 0.1 |

The products of this invention were tested in an ester lubricant consisting of a pentaerythritol ester of mixed $C_5$ and $C_9$ monocarboxylic acids at 425° F. for 24 hours. The test conditions are more adverse to oil stability, however the additives still provide oxidation inhibition even at the elevated temperatures. The results are as follows:

TABLE 2

| Additive | Conc., wt. percent | Net NN change | KV change, percent | Lead loss, mg. |
|---|---|---|---|---|
| None | | 4.9 | 312 | 21.7 |
| Product of Example 1 | 2 | 3.7 | 39 | 7 |
| | 1 | 6.2 | 87 | 14 |
| | 0.5 | 7.3 | 169 | 12 |
| Product of Example 2 | 2 | 5.4 | 112 | 9 |
| | 1 | 7.4 | 146 | 10 |
| | 0.5 | 9.4 | 231 | 7 |
| Product of Example 3 | 2 | 4.8 | 56 | 21 |
| | 1 | 7.7 | 166 | 23 |
| | 0.5 | 9.5 | 584 | 7 |

A mineral oil sample containing a compound of the theoretical structure:

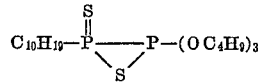

prepared in accordance with the above examples, was subjected to the oxidation test of 325° F. for 40 hours with the following results:

| Conc., wt. percent | Net NN change | KV change, percent | Lead loss, mg. |
|---|---|---|---|
| 2 | −7.9 | 8 | 2 |
| 1 | −7.9 | 7 | 3 |
| 0.5 | −7.9 | 6 | 2 |

The same compound was further tested in a mineral oil in a CLR Single-Cylinder Oil Test Engine. The additive concentration was 0.75% by weight. In the test, the engine was operated for 40 hours at a speed of about 3150±10 r.p.m. The oil temperature may reach over 275° F. during the operation. The fuel used was isooctane with a minor quantity of tetraethyl lead. This test is to evaluate high temperature oxidation properties of crank case lubricants. Two measurements are weight loss of a copper-lead bearing and amount of engine deposits. The results of the engine run are as follows:

Bearing weight change, mg.—+27 (50 mg. maximum)
Piston varnish rating—6.6 (10 clean)
Sludge—10.0 (10 clean)

The performance of these additives in the various oxidation and engine tests is evidence of the utility of these novel compounds in industrial fluids, such as oil compositions. Other additives are, of course, desirable in association with the compounds of this invention.

This invention is not limited in its broadest scope to the specific embodiments and other illustrating descriptions hereinabove presented, but may include minor variations which may be obvious to one skilled in the art.

Having disclosed my invention, I claim:

1. An organic composition comprising a major proportion of an organic base medium, chosen from the group consisting of natural and synthetic lubricating oils and greases and hydrocarbon fuels, and a minor proportion sufficient to provide antioxidant properties thereto of an additive compound produced by the reaction between (1) a thionophosphine sulfide having the structure:

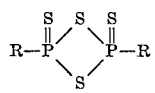

wherein R is a hydrocarbyl group and (2) a phosphorus nucleophile of the structure:

$$P(R')_3$$

wherein R' is selected from the group consisting of hydrocarbyl, hydrocarbyloxy, hydrocarbylthio and hydrocarbylamino and halogen derivatives thereof.

2. The composition of claim 1 wherein R is alkenyl having from 2 to 35 carbon atoms.
3. The composition of claim 1 wherein R is alkenyl having 6 to 18 carbon atoms.
4. The composition of claim 3 wherein R is decenyl.
5. The composition of claim 3 wherein R is hexadecenyl.
6. The composition of claim 1 wherein R is an aromatic hydrocarbyl group.
7. The composition of claim 1 wherein R is phenyl.
8. The composition of claim 1 wherein R' is an alkyl group having 2 to 15 carbon atoms.
9. The composition of claim 8 wherein R' is butyl.
10. The composition of claim 1 wherein R' is aryl.
11. The composition of claim 10 wherein R' is phenyl.
12. The composition of claim 1 wherein R' is a hydrocarbyloxy group.
13. The composition of claim 12 wherein R' is ethoxy.
14. The composition of claim 12 wherein R' is butoxy.
15. The composition of claim 12 wherein R' is phenoxy.
16. The composition of claim 1 wherein the organic fluid is a lubricating oil.
17. The composition of claim 16 wherein the lubricating oil is a mineral oil.
18. The composition of claim 16 wherein the lubricating oil is an ester oil.

References Cited

UNITED STATES PATENTS

| 2,534,217 | 12/1950 | Bartleson | 44—76 X |
| 2,766,206 | 10/1956 | Alford et al. | 252—46.6 X |
| 3,213,019 | 10/1965 | Koft et al. | 252—25 X |
| 3,235,497 | 2/1966 | Lee | 252—46.7 |
| 3,291,734 | 12/1966 | Liao | 252—46.7 |

DANIEL E. WYMAN, Primary Examiner

J. M. HICKEY, Assistant Examiner

U.S. Cl. X.R.

252—46.7, 400; 44—76; 260—927, 545, 606.5, 933